United States Patent [19]

Miller

[11] 3,950,032

[45] Apr. 13, 1976

[54] INNER RIM WEDGE LOCK MOUNT WHEEL

[76] Inventor: Eugene J. Miller, 3912 W. Oak St., McHenry, Ill. 60050

[22] Filed: Nov. 11, 1974

[21] Appl. No.: 522,778

[52] U.S. Cl. .............................. 301/18; 301/11 R
[51] Int. Cl.² ....................................... B60B 23/02
[58] Field of Search .......... 301/1, 10 R, 11 R, 12 R, 301/12 M, 18–22

[56] References Cited
UNITED STATES PATENTS

| | | | |
|---|---|---|---|
| 1,027,158 | 5/1912 | Schwarz | 301/12 R X |
| 1,952,075 | 3/1934 | Keller | 301/12 R |
| 2,169,167 | 8/1939 | Schroeder | 301/1 |
| 2,726,106 | 12/1955 | Houck | 301/1 UX |
| 3,237,991 | 3/1966 | Hurst | 301/12 R |

Primary Examiner—John J. Love
Assistant Examiner—Andres Kashnikow
Attorney, Agent, or Firm—Bruce K. Thomas

[57] ABSTRACT

A wedge-shaped split ring is interposed between the rim and hub of a heavy vehicle wheel to prevent the rim and hub from separating during use and maintain a predetermined relationship or proper contact at the yield point between the wheel and hub during extreme torque and weight conditions. Bolts are provided for axially tensioning the split ring relative to a cam surface to the required radial support and contact. The mounting is designed primarily for extremely heavy duty earth moving equipment and the like. The split ring is expanded or contracted by adjustably tensioning bolts to distribute the weight of the vehicle upon the hub.

9 Claims, 7 Drawing Figures

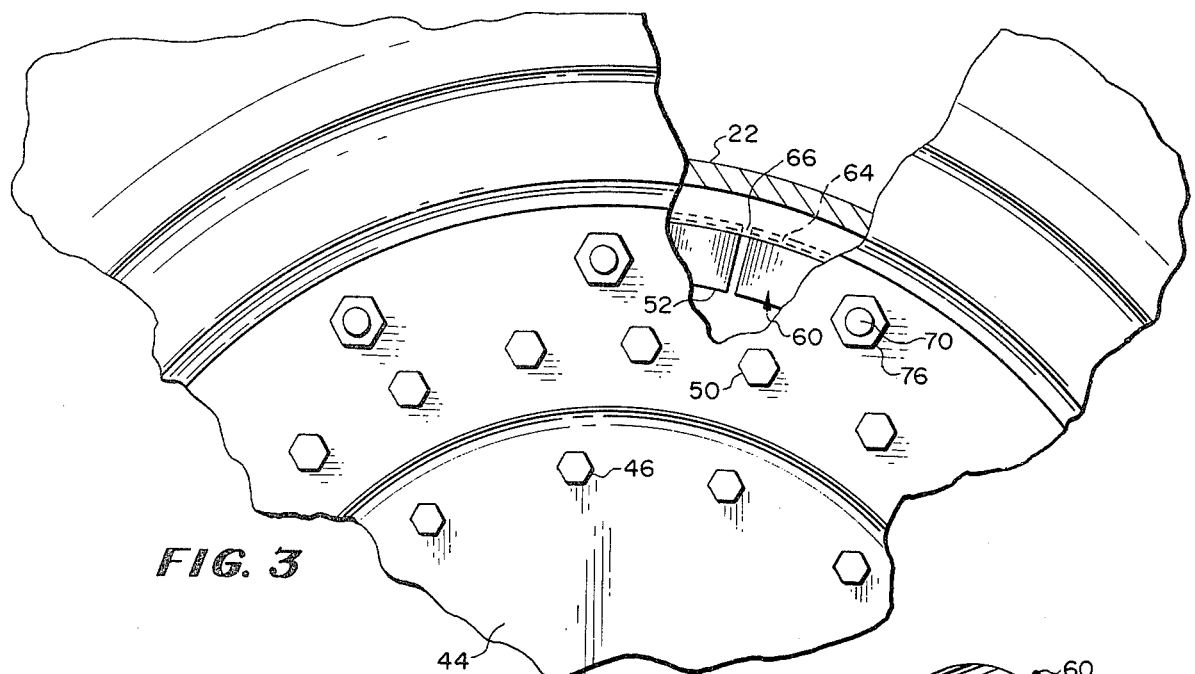
FIG. 3
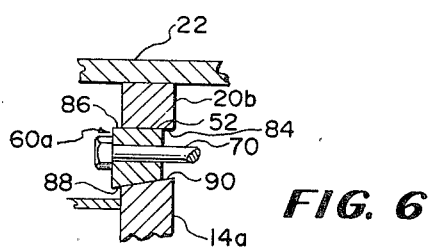
FIG. 6
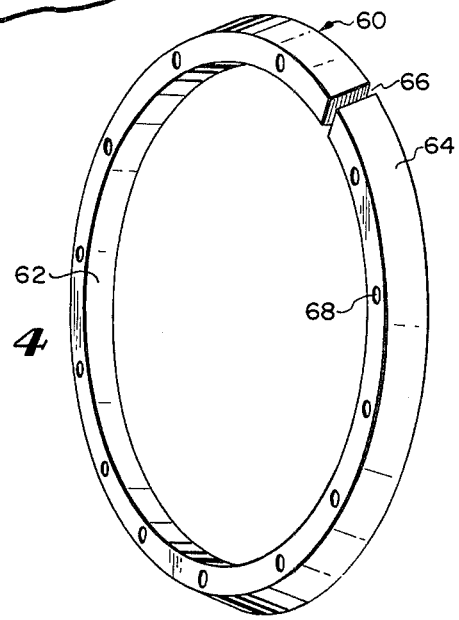
FIG. 4
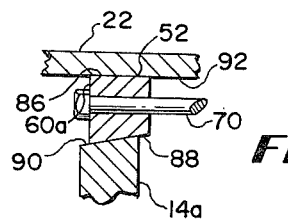
FIG. 7
FIG. 5
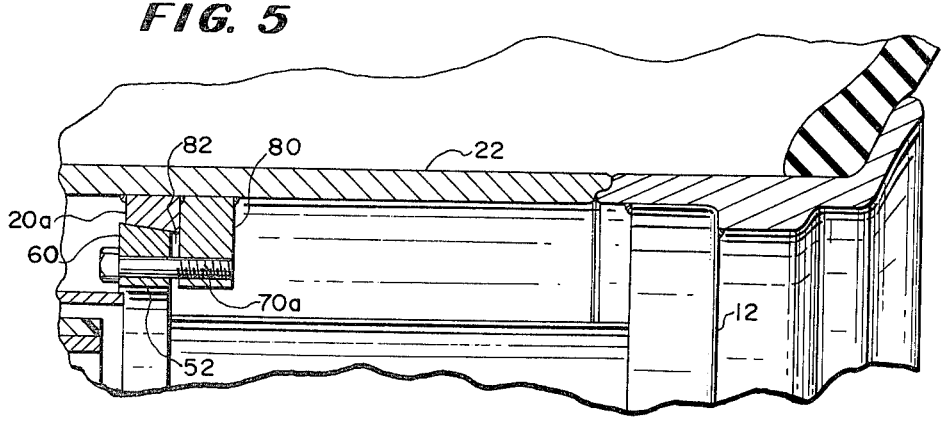

INNER RIM WEDGE LOCK MOUNT WHEEL

THE PRIOR ART

The wheels of heavy duty earth moving equipment operate under extreme load and torque conditions. For example, wheel loaders having up to 30 cubic yard capacities are now in use having empty weights as much as 100,000 lbs. Such machines are equipped with four rubber-tired drive wheels mounted on an articulated frame and driven with internal combustion engines having horse powers as high as 750. The hub of such wheels forms a housing for reduction gears which with the transmission provide as many as ten forward speeds. A pressurized fluid system is also contained in the wheel, connected to the tire for the purpose of maintaining tire pressure and weight. Load conditions on a wheel during earth moving operations can exceed 100,000 lbs.

Under these extreme conditions of torque and load, the wheel mount bolts that hold the wheel and rim to the hub are stretched and the weldments in the rim crack and break causing loss of air and fluid from the tires. The result is distruction of an expensive tire as the machine collapses on it. Bolt failure also causes damage to the mounting bolt holes and other parts which leads to hub failure. The costs of down time and repairs are prohibitive. Machines of this type must be operated in the lower speeds in order to reduce such failures. Inevitably, the result is reduced efficiency and increased operating costs.

No prior art is available which is directed to this kind of problem in heavy duty construction machines. Keller U.S. Pat. No. 1,952,075 illustrates a slide having a rim seating member with an inclined surface. However, KELLER's slides are individual units and one is used for each spoke of the wheel and his purpose is to draw two rims of a dual wheel assembly into alignment. Dependence is had on the spacers to accomplish this purpose. Other structures for dual rims, such as Hurst U.S. Pat. No. 3,237,991 are disclosed. In general, these prior art structures are for dual rim light duty wheels and do not share the problem solved by the instant invention.

SUMMARY OF THE INVENTION

In accordance with one embodiment of this invention both side walls of the wheel assembly are modified to provide for the mounting of a wedge-shaped split ring on one of the sides. This wedge lock includes a beveled surface mating with the wheel or the hub providing an optimum circumferential contact between the supportive parts and finite and controlled flexing under stress. The beveled camming surface can be on either surface of the split ring or wedge lock to provide for is expansion or contraction into this predetermined relationship.

In practice, modification of existing heavy duty wheels to close the clearance between the wheel and hub parts has been to little avail in reducing hub failure. The holding bolts still failed during use. Expensive machining and polishing of the parts to provide relatively close but uncontrolled tolerances at this circumferential spacing has been attempted without success. The instant invention has eliminated this kind of wheel failure problem. A heavy wheel loader modified in accordance with this invention has been operated in all speeds under conditions more severe than those that caused wheel failure at lower speeds, without any indication of such failure. Existing wheels for giant machines can be readily modified to incorporate the changes made by this invention or new assemblies can be designed to incorporate its features.

DESCRIPTION OF THE DRAWINGS

An illustrative embodiment of the invention is disclosed in the drawings wherein:

FIG. 3 is a partial cross-sectional view taken along the lines 3—3 of FIG. 2;

FIG. 4 is a perspective view of the wedge-shaped split ring of this invention;

FIG. 5 is a fragmentary cross-sectional view like FIG. 2 showing another modification of this invention;

FIG. 6 is a fragmentary cross-sectional view showing an alternative expanding split ring; and FIG. 7 is a view like FIG. 7 showing an alternate modified structure.

DESCRIPTION OF THE PRIOR ART HUB-WHEEL ASSEMBLY

Figure 1:
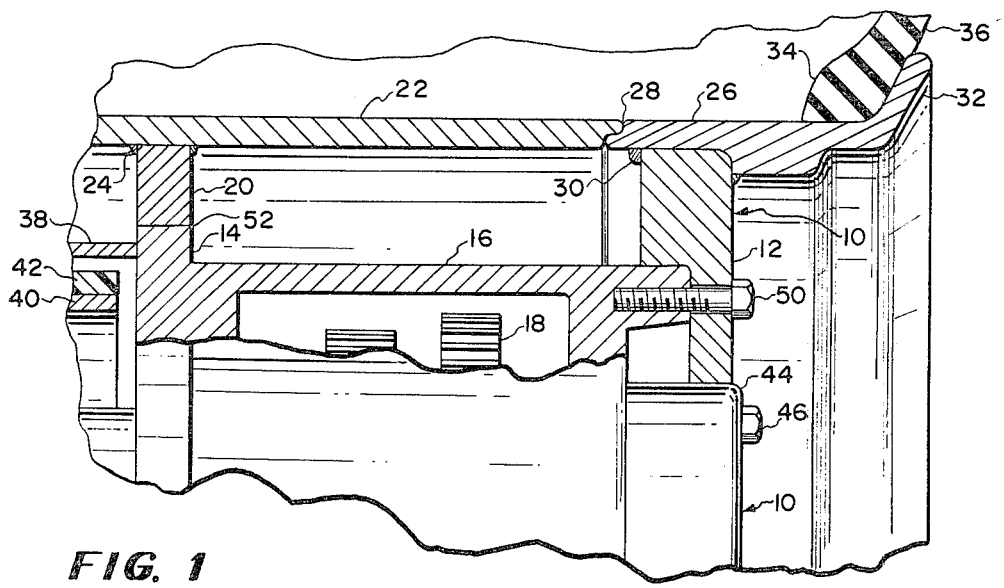
FIG. 1 is a fragmentary cross-sectional view of the hub-wheel assembly of the prior art before the modifications of this invention are incorporated.

As before stated, FIG. 1 shows the essential parts of a prior art hub and wheel that is subject to failure under extreme load and torque conditions. The wheel assembly 10 includes the outer wheel mount flange 12 and the inner closure plate 14 which are circular plate members defining the driven member or wheel, connected by the supporting housing and wheel mount means. These parts define the hub housing 17 for the reduction gear system represented by the gears 18. The axle, bearings and other details of the hub construction have been omitted for simplicity, and only the essential parts are shown.

The wheel assembly 10 has the inner circumferential bumper ring 20 attached to the rim base 22 as by the weldments 24. The rim 22 has the bead base 26, abutting therewith and attached at the weldment and is also attached to the wheel mount flange 12 as at the weldments 30.

In describing all of the parts of the assembly 10, the nomenclature used is that employed in this art and not all of the parts are shown. Thus, as one skilled in the art is aware, the rim 22–26, though shown to have a simplified flange 32, in actuality is a more complicated structure and the other side of the rim, which is not shown, is likewise not a simple rim. Since these parts do not enter into the invention it is not necessary to show their details. One skilled in the art knows that the mounting of the beads 34 of the huge tire 36 requires a tapered surface on the rim base 22 and such parts as the bead band, a continuous ring to take up the difference in circumference on the side shown along with a bead back band and a bead back band lock ring which parts are now shown. It suffices to point out that the mounting of the tire 36 is a difficult and time consuming task, to say the least, and these parts interlock in a groove (not shown) in the bead base 26 and are held in place by the expansion of the tire and lateral or axial movement of the beads 34 from areas of smaller diameter to areas of larger diameter as the tire is inflated. The conduits and the pump for air or water inflation of the tire 32 has been omitted for simplicity. Water is used to increase the weight and traction.

The inner closure plate 14 carries the brake drum 38 while a stationary part of the axle assembly retains the brake shoe 40 having the brake band 42 for engagement therewith. The hub housing 17 is provided with an outer end opening having the inspection plate or cover 44 held by a plurality of bolts 46. The wheel assembly which includes the parts 12, 20, 22 and 26 is held to the driving hub 17 by a series of circumferentially spaced cap screws 50 which engage through the wheel mount flange 12 into the inner wheel mount means 16.

The bumper ring 20 and the inner closure plate 14 meet at the spaced circumferential juncture 52 and are not otherwise attached. Thus, by removal of the cap screws 50 the wheel and tire can be removed from the machine.

The juncture 52 is intended to be a sliding fit between the bumper ring 20 and the closure plate 14 with a clearance of about .040 inch. The weight of the machine is distributed over the juncture 52 and the outer wheel mount flange 12. This type of mounting is essential for a machine of this weight because if the parts are otherwise assembled, they tend to become set and difficult to remove. Also placement of any bolts on the inside of the wheel makes access difficult if not impossible especially under less than ideal field conditions.

The flexing of the wheel at this juncture 52 is a necessary part of the structure. However, the torque stresses imparted to the wheel assembly when rotative force is transmitted from the reduction gear drive to the axle and outer wheel or hub have been found in practice to not only stretch and break the cap screws 50 but also cause a severe pounding and peening of the parts 14 and 20 at the juncture 52. The result is a gradual increase in the gap at 52, allowing the flexing of the rim assembly and cracking of the weldment 28 or any other similar welds with the result that the tire 36 loses its pressure suddenly and the machine collapses on the tire. Not only is the machine incapacitated, but the extreme weight of the machine ruins the tire. Sometimes the cap screws 50 snap and disintegration of the wheel structure results. The incidence of this kind of wheel failure has become a serious problem with concomitant expensive down time and repairs in the heavy construction machinery art.

Attempts have been made to remedy this situation by reduction of the gap 52 to 0.020 inch to no avail. As this gap size is reduced the assembly of the wheel to the hub is made more difficult. Even machining and polishing of the parts 14 and 20 at the juncture 52 has been attempted to close the gap 52 even further. This adds to the difficulty of assembly, greatly increases the production costs, and has not eliminated the problem.

This invention provides the means by which the gap 52 can be finitely adjusted and closed, whereby the hub assembly does not bind or lock together nor does it twist under torque or weight shifting conditions to the extent allowed by the prior art hub, and the cap screws are not subjected to extreme axial thrust and twist during the operation of the machine.

Figure 2:
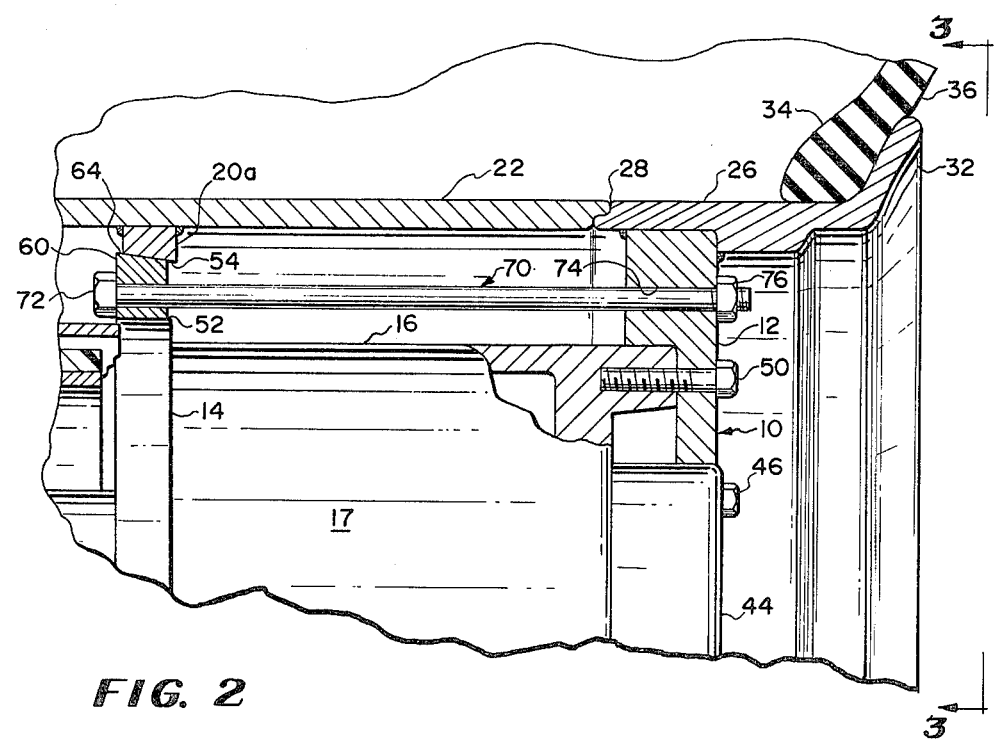
FIG. 2 is fragmentary cross-section like FIG. 1 showing the modifications of this invention.

Referring to FIGS. 2, 3 and 4, the same wheel and hub assembly is shown except that the inner bumper ring 20a has been modified, i.e., this part has been reduced radially to include the beveled circumferential surface 54 and the wedge-shaped split ring 60 interposed for the part taken away. As shown in FIG. 4, the split ring 60 terminates radially with a cylindrical inner face 62 which now defines a closed, totally supportive juncture 52 with the closure plate 14 (FIG. 2). The ring 60 has the matching outer beveled surface 64 which engages in a camming relationship with the inner surface 54 of the bumper ring 20a. The split ring 60 is one piece and circular and includes the split or dis-continuity 66 at a point in the circumference. This gap 66 can be any length and for most hubs can be about 0.25 to 0.325 inch. The space 66 is subject to variation for hubs of different diameters. The purpose of the space 66 is to allow contraction of the split ring 60 as it cams against the surface 54 and contracts against the closure plate 14 at the juncture 52.

Means are provided to draw the split ring 60 axially into this position in the form of a plurality of axially oriented and circumferentially spaced bore holes 68 in the split 60 to receive the through bolts 70 which have their head ends 72 on the inside of the hub assembly holding against the side of the split ring 60. The wheel mount flange 12 has been modified to include a plurality of axially matching bore holes 74 to receive the other ends of the through bolts 70, which are long enough to receive the nuts 76 at their threaded outer ends. This places the nuts 76 on the outer exposed-side of the wheel for ease in attachment and in making the necessary adjustments. The through bolts 70 are equally spaced circumferentlally around the hub. This relationship is shown in FIG. 3.

As is apparent the through bolts 70 serve the function of drawing the split ring 60 axially into the space between the parts 20a and 14 with the beveled surfaces 54 and 64 in camming relationship to contract the ring and close the juncture 52 thereabout.

A 14 cubic yard wheel loader having the hubs of its four wheels so modified has now been in service for several months using all forward speeds under the most severe experimental and on the job conditions of stress, load and torque without failure to the wheel and mount bolts.

FIG. 5 shows a modification of this principle in which the radial inner flange 80 has been attached to the rim base 22 adjacent to the bumper ring 20a and shorter tensioning means in the form of the cap screws 70a are connected between said flange and the split ring 60. The remaining parts of the assembly are the same except that the bore holes 74 in wheel mount flange 12 are omitted. The same relationship of parts and their functions exists in this structure as were described in relation to FIGS. 2–4. The space 82 is allowed so that the split ring 60 can be moved axially by adjustment of the through bolts 70a. The operation is normally accomplished by a torque wrench to take up the split ring evenly and gradually.

In adjusting the split ring 60 in either embodiment the juncture 52 can be closed or left in a finite gap relationship as desired. In the former position the weight of the machine is distributed over both inner and outer bearing surfaces of the hub. In the latter relationship a very small amount of flexing, not sufficient to strain the bolts 50 or 70, and within the limits of their fit in their respective bore holes, can be tolerated. The angle of the matching beveled surfaces 54 and 64 is subject to some variation depending on design and material considerations. In general the angle of the beveled contact 54–64 from the axial line of the wheel is about 8° to 12° although smaller or larger angles can be used not to exceed 14° or less than 6°. Preferably, the angle is about 10° which has been proven to give a satisfactory inclined plane mechanical advantage in the tests so far performed.

It is apparent that the critical spacing or juncture 52 can be on the outer periphery of the split ring 60 rather than on the inner surface as thus far described. This is illustrated in FIG. 6 wherein the bumper ring 20b is modified to include the axially aligned circumferential surface 84 wich opposes the axially aligned surface 86, in the desired contact or finite spacing 52, of the further modified split ring 60a. In this embodiment the split ring 60a has the camming surface 88 on the inside periphery which tapers outwardly and the closure plate 14a is modified to present the correspondingly outwardly tapered and matching cam surface 90 as the counter part of surface 54. This arrangement can be used with the long through bolts 70 or the short cap screws 70a as shown in FIG. 5. In this embodiment the split ring 60a expands during adjustment of the tension on the bolts 70.

One advantage of placing the beveled camming surfaces on the inside of the split ring, as shown in FIG. 6, is that the bumper ring 20b can be eliminated. This is shown in FIG. 7 wherein the critical contact 52 is defined between the outer surface 86 of the modified split ring 60a and the inner surface 92 of the rim portion 22. FIG. 7 also shows that the camming surfaces 88 and 90 can be in different contact relationships, that is, full flush peripheral contact is not essential. Again increasing the tension on the bolts 70 gradually and uniformly expands the ring for finite adjustment of the space or juncture 52.

The space or juncture 52 is so defined because in some hub assemblies it may be advantageous to expand or contract the split ring so that a finite or predetermined circumferential space is provided. In other hub assemblies these parts may be closed and no space provided. With either adjustment the weight of the vehicle on the axle is distributed between the wheel mount flange 12 and the bumper ring 20 or the rim 22 by the split ring. By providing a finite but substantially uniform space at 52, a limited flexing of the assembly results as the wheel rotates without placing destructive stress on the bolts 70 as previously described. Furthermore, the ring does not bind and is readily removed.

From the description of the several embodiments of the invention, it is seen that the split-ring 60, whether contracted to smaller diameters in the embodiment of FIGS. 2 and 5 during adjustment or expanded to a larger diameter as shown in FIGS. 6 and 7, provides either an inner contracting surface 62 or an outer expanding surface 86 which is positionable in a desired relationship at the juncture 52 with the bumper ring 20 or the rim 22 by use of the adjustable tensioning means 70. This relationship can be a very small spacing in the order of 0.010 inch to 0.001 inch or preferably actual peripheral contact can be made. In any event, the weight of the machine is equally distributed axially over the wheel. The inherent spring action of the split ring causes it to loosen and cam away from its locked position during dis-assembly In its relieved condition the split-ring 60 expands or contracts and in this condition its changed diameter is such that it could be handfitted into a starting position prior to applying axial tension.

If desired, suitable high pressure lubricants, such as a silicone or Teflon coating can be applied in a thin layer to the inner and outer surfaces of the split ring in order to inhibit rust and prevent fressing of the parts under adverse conditions. In the event some looseness develops it is immediately detectable by applying a torque wrench to the nuts 76. By maintaining the turning torque of the nuts at substantially constant values the proper functioning of the split-ring is assured.

Preferably, the changes in diameter imparted to the split ring are such that once in proper position between the wheel and hub a substantial portion of its axial surface is in contact between the fixed parts so that the contacting surfaces are about as wide as the split ring itself.

Other adjustable tensioning means can be used in place of the through bolts 70. Set screws extending through an intermittent flange can be used to push the split ring into position from the inside of the wheel or a plurality of lug-bolts can also be used with spaced lugs that engage over the inner or outer edge of the ring. Other arrangements will become apparent to one skilled in the art.

What is claimed is:

1. A wheel-hub assembly for heavy mobile machinery comprising:
   a wheel member having a radial member supporting an outer circumferential rim member;
   an inner surface of said rim member and an outer surface of said wheel member defining a pair of spaced opposing circumferentially disposed weight-supporting surfaces one of which is a beveled surfaced and the other of which is a substantially cylindrical surface, said surfaces being axially displaced from said radial wheel member;
   a split-ring disposed between said spaced surfaces and presenting a beveled surface and a substantially cylindrical surface corresponding to the respective beveled and cylindrical surfaces of said rim and wheel members; and
   adjustable means to move said split-ring axially whereby said opposed beveled surfaces cam one against the other and change the diameter of said split-ring to bring its cylindrical surface into a predetermined spaced relationship with aid cylindrical surface of said assembly and flexibly distribute the weight of said mobile machinery axially between said radial member and said cylindrical surfaces.

2. A wheel-hub assembly for heavy mobile machinery comprising:
   a wheel member having a pair of axially spaced radial flange members;
   a circumferential rim member supported along one side upon one of said flange members and extending along the other side over and spaced from the other flange member and defining respectively therebetween an inner beveled cam surface and an outer substantially cylindrical surface concentric therewith;
   a split-ring having an outer beveled cam surface corresponding to and slidably engageable with the inner beveled cam surface of said rim member and an inner substantially cylindrical surface corresponding to the outer substantially cylindrical surface of said other flange; and
   adjustable means to force said split-ring axially within said inner beveled cam surface of said rim member whereby said split-ring is contracted and is cylindrical surface is positionable in a predetermined relationship with the cylindrical surface of said other flange and provide yieldable axial support therealong.

3. A wheel-hub assembly for heavy mobile machinery in accordance with claim 2 in which:
said beveled surfaces taper radially inwardly toward said one flange member at an angle of about 8° to 12°.

4. A wheel-hub assembly for heavy mobile machinery in accordance with claim 2 in which:
said adjustable means comprises a plurality of circumferentially spaced axially disposed through bolts connecting between said splitring and said one flange member.

5. A wheel-hub assembly for heavy mobile machinery comprising:
a wheel member having a pair of axially spaced radial flange members;
a circumferential rim member supported along one side upon one of said flange members and extending along the other side over and spaced from the other flange member and defining respectively therebetween an outer beveled cam surface and an inner substantially cylindrical surface concentric therewith;
a split-ring having a beveled cam surface corresponding to and slidably engageable with the beveled cam surface of said rim member and a substantially cylindrical surface corresponding to the substantially cylindrical surface of said other flange; and
adjustable means to force said split-ring axially within said inner beveled cam surface of said rim member whereby said split-ring is contracted and its cylindrical surface is positionable in a predetermined relationship with the cylindrical surface of said other flange and provides yieldable axial support therealong.

6. A wheel-hub assembly for heavy mobile machinery comprising:
a hub member having a circumferential wheel mount flange at one end and a circumferential closure plate at the other end and axially spaced from said wheel mount flange;
a rim supported circumferentially about said wheel mount flange;
said rim and said closure plate defining a pair of spaced opposing circumferentially disposed surfaces, one of which is beveled and the other of which is substantially cylindrical;
a split-ring disposed within said circumferential space;
said split-ring presenting a beveled surface and a substantially cylindrical surface corresponding to the respective beveled and cylindrical surfaces of said rim and said closure plate; and
adjustable means to move said split ring axially whereby said opposed beveled surfaces cam one against the other and change the diameter of said split-ring to bring its cylindrical surface into a predetermined closed relationship with said cylindrical surface of said assembly and distribute the weight of said rim between said wheel mount flange and said closure plate.

7. A wheel-hub assembly for heavy mobile machinery comprising:
a wheel member having a radial member supporting an outer circumferential rim member;
an inner surface of said rim member defining a beveled circumferential surface which tapers axially toward and is axially spaced from said radial member;
an outer surface of said wheel member defining a substantially cylindrical surface opposed to and circumferentially spaced from said inner beveled surface on said rim member;
a split-ring disposed between said surfaces and presenting an outer beveled surface corresponding to and slidably engageable with said beveled surface of said rim member and presenting an inner substantially cylindrical surface opposed to and spaced from said substantially cylindrical outer surface of said wheel member; and
adjustable means to uniformly move said split-ring axially whereby said opposed beveled surfaces cam one against the other to contract said split-ring and bring its inner cylindrical surface into finite spaced relationship with said cylindrical surface of said wheel member and thereby flexibly distribute the weight of said mobile machinery axially between said radial member and said cylindrical surfaces.

8. A wheel-hub assembly for heavy mobile machinery comprising:
a wheel member having a radial member supporting an outer circumferential rim member;
an inner surface of said rim member defining a substantially cylindrical surface which is axially spaced from said radial member;
an outer surface of said wheel member defining a beveled circumferential surface which tapers axially away from and is axially spaced from said radial flange member;
a split-ring disposed between said surfaces and presenting an outer substantially cylindrical surface opposed to and spaced from said substantially cylindrical surface of said rim member and presenting an inner beveled surface corresponding to and slidably engageable with said beveled surface of said wheel member; and
adjustable means to uniformly move said split-ring axially whereby said opposed beveled surfaces cam one against the other to expand said split-ring and bring its outer cylindrical surface into finite spaced relationship with said cylindrical surface of said rim member and thereby flexibly distribute the weight of said mobile machinery axially between said radial member and said cylindrical surfaces.

9. A wheel-hub assembly for heavy mobile machinery comprising:
a wheel having a radial member supporting an outer circumferential rim member;
an inner surface of said rim member and an outer surface of said wheel member defining a pair of spaced opposing circumferentially disposed weight-supporting surfaces one of which is a beveled surface and the other of which is a substantially cylindrical surface, said surfaces being axially displaced from said radial wheel member;
a split-ring disposed between said surfaces and presenting a beveled surface and a substantially cylindrical surface corresponding to the respective beveled and cylindrical surfaces of said rim and wheel members;
an inner circumferential flange member disposed adjacent to and spaced from said split-ring; and
adjustable means to move said split-ring axially comprising a plurality of circumferentially disposed and spaced bolts extending between said split-ring and said flange member whereby said opposed surfaces cam one against the other and change the diameter of said split-ring to bring its cylindrical surface into a predetermined spaced relationship with said cylindrical surface of said assembly and thereby flexibly diatribute the weight of said mobile machinery axially between said radial member and said cylindrical surfaces.

* * * * *

UNITED STATES PATENT OFFICE
CERTIFICATE OF CORRECTION

PATENT NO. : 3,950,032
DATED      : April 13, 1976
INVENTOR(S) : EUGENE J. MILLER It is certified that error appears in the above-identified patent and that said Letters Patent are hereby corrected as shown below:

Claim 1, Column 6, line 30, after "beveled", delete "surfaced" and insert ----- surface -----.

line 42, after "with", delete "aid" and insert ----- said -----.

Claim 2, Column 6, line 65, after "and", delete "is" and insert ----- its -----.

Claim 9, Column 8, line 50, after "wheel", insert ----- member -----.

Signed and Sealed this

Twentieth Day of July 1976

[SEAL]

*Attest:*

RUTH C. MASON
*Attesting Officer*

C. MARSHALL DANN
*Commissioner of Patents and Trademarks*